US009540922B2

(12) United States Patent
Zhong et al.

(10) Patent No.: US 9,540,922 B2
(45) Date of Patent: Jan. 10, 2017

(54) ELECTROMAGNETIC METHOD FOR OBTAINING DIP AZIMUTH ANGLE

(71) Applicant: Schlumberger Technology Corporation, Sugar Land, TX (US)

(72) Inventors: Xiaoyan Zhong, Sugar Land, TX (US); Gerald N. Minerbo, Missouri City, TX (US); Steven F. Crary, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 641 days.

(21) Appl. No.: 13/800,271

(22) Filed: Mar. 13, 2013

(65) Prior Publication Data

US 2014/0107929 A1 Apr. 17, 2014

Related U.S. Application Data

(60) Provisional application No. 61/617,412, filed on Mar. 29, 2012.

(51) Int. Cl.
*E21B 47/022* (2012.01)
*G01V 3/26* (2006.01)

(52) U.S. Cl.
CPC .......... *E21B 47/02216* (2013.01); *G01V 3/26* (2013.01)

(58) Field of Classification Search
CPC .................................. E21B 47/02216
USPC .......................................................... 702/7
See application file for complete search history.

(56) References Cited

U.S. PATENT DOCUMENTS

| 5,508,616 | A | 4/1996 | Sato et al. |
|---|---|---|---|
| 6,163,155 | A | 12/2000 | Bittar |
| 6,181,138 | B1 | 1/2001 | Hagiwara et al. |
| 6,297,639 | B1 | 10/2001 | Clark et al. |
| 6,351,127 | B1 | 2/2002 | Rosthal et al. |
| 6,476,609 | B1 | 11/2002 | Bittar |
| 6,566,881 | B2 | 5/2003 | Omeragic et al. |
| 6,794,875 | B2 | 9/2004 | Strickland |
| 6,969,994 | B2 | 11/2005 | Minerbo et al. |
| 6,998,844 | B2 | 2/2006 | Omeragic et al. |
| 7,202,670 | B2 | 4/2007 | Omeragic et al. |

(Continued)

FOREIGN PATENT DOCUMENTS

| CN | 201763321 U | 3/2011 |
|---|---|---|
| CN | 102071924 A | 5/2011 |

(Continued)

OTHER PUBLICATIONS

International Search Report and Written Opinion for International Application No. PCT/US2013/034566 dated Jul. 15, 2013.

(Continued)

*Primary Examiner* — Bryan Bui
(74) *Attorney, Agent, or Firm* — John Vereb

(57) ABSTRACT

An electromagnetic method for obtaining a dip azimuth angle from downhole electromagnetic measurements includes acquiring electromagnetic measurement data in a subterranean borehole from at least one measurement array. The electromagnetic measurement data is processed by a least squares method to obtain the dip azimuth angle. Related systems and apparatuses are also disclosed herein.

13 Claims, 6 Drawing Sheets

(56) References Cited

U.S. PATENT DOCUMENTS

| | | |
|---|---|---|
| 7,382,135 B2 | 6/2008 | Li et al. |
| 7,630,872 B2 | 12/2009 | Xia et al. |
| 7,991,555 B2 | 8/2011 | Yang et al. |
| 8,274,289 B2 * | 9/2012 | Bittar .................. E21B 47/024 324/338 |
| 8,736,270 B2 | 5/2014 | Seydoux et al. |
| 2003/0028324 A1 | 2/2003 | Xiao et al. |
| 2003/0055565 A1 | 3/2003 | Omeragic |
| 2008/0136419 A1 * | 6/2008 | Seydoux .................. G01V 3/28 324/333 |
| 2009/0015261 A1 | 1/2009 | Yang et al. |
| 2010/0198569 A1 | 8/2010 | Wu et al. |
| 2010/0230095 A1 | 9/2010 | Yin |
| 2010/0277176 A1 | 11/2010 | Homan et al. |
| 2011/0068798 A1 | 3/2011 | Minerbo et al. |
| 2011/0074427 A1 | 3/2011 | Wang et al. |
| 2011/0238312 A1 | 9/2011 | Seydoux et al. |
| 2011/0254552 A1 | 10/2011 | Wu et al. |
| 2012/0166086 A1 * | 6/2012 | Zhong et al. .................. 702/7 |

FOREIGN PATENT DOCUMENTS

| | | |
|---|---|---|
| EP | 0930519 B1 | 10/2008 |
| RU | 2368922 C2 | 9/2009 |

OTHER PUBLICATIONS

Communication pursuant to Article 94(3) EPC for EP Application No. 13768691.1 dated Dec. 16, 2015.
Supplementary European Search Report for EP Application No. 13768691.1 dated Dec. 4, 2015.
Wu, et al. "Borehole Effects and Correction in OBM With Dip and Anistropy for Triaxial Induction Tools," Proceedings of the 2007 SPE Annual Technical Conference and Exhibition, No. 110623, Nov. 11, 2007, pp. 1-20.
Russian Decision on Grant for Russian Application No. 2014143467 dated Dec. 4, 2015.
First Office Action issued in related CN application 201380026740.6 on May 24, 2016, 14 pages.
International Preliminary Report on Patentability issued in PCT/US2013/034566 on Oct. 9, 2014. 8 pages.

* cited by examiner

US 9,540,922 B2

ELECTROMAGNETIC METHOD FOR OBTAINING DIP AZIMUTH ANGLE

CROSS REFERENCE TO RELATED APPLICATIONS

This application claims priority to and the benefit of U.S. Provisional Application Ser. No. 61/617,412 entitled Methods of Measuring Dip Azimuth Angle, filed Mar. 29, 2012, the disclosure of which is hereby incorporated by reference in its entirety.

FIELD OF THE INVENTION

Disclosed embodiments relate generally to downhole electromagnetic logging methods and more particularly to a method for obtaining a dip azimuth angle.

BACKGROUND INFORMATION

The use of electromagnetic measurements in prior art downhole applications, such as logging while drilling (LWD) and wireline logging applications is well known. Such techniques may be utilized to determine a subterranean formation resistivity, which, along with formation porosity measurements, is often used to indicate the presence of hydrocarbons in the formation. Moreover, azimuthally sensitive directional resistivity measurements are commonly employed e.g., in pay-zone steering applications, to provide information upon which steering decisions may be made, for example, including distance and direction to a remote bed. Directional resistivity tools often make use of tilted or transverse antennas (antennas that have a magnetic dipole that is tilted or transverse with respect to the tool axis).

One challenging aspect in utilizing directional electromagnetic resistivity measurements, such as acquired a model of PeriScope®, an LWD downhole tool available from Schlumberger Technology Corporation, Sugar Land, Tex., is obtaining a reliable measurement of the dip azimuth angle between the borehole and a remote bed boundary. Prior art methods (which are described in more detail below) for obtaining the dip azimuth angle can be both noisy and susceptible to phase wrapping issues. Therefore, there is a need in the art for a more robust method for obtaining the dip azimuth angle from electromagnetic measurements.

SUMMARY

A method for computing a dip azimuth angle from downhole electromagnetic measurements is disclosed. The method includes acquiring electromagnetic measurement data in a subterranean borehole from at least one measurement array. The electromagnetic measurement data is processed to obtain least squares coefficients which are further processed to obtain the dip azimuth angle.

The disclosed embodiments may provide various technical advantages. For example, the disclosed least square estimation technique (computing the dip azimuth angle from a least squares criterion applied to the acquired voltages) provides a more accurate, less noisy estimation of the dip azimuth angle. Moreover, the phase wrapping issues inherent in the prior art methodology are avoided.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Figure 1:
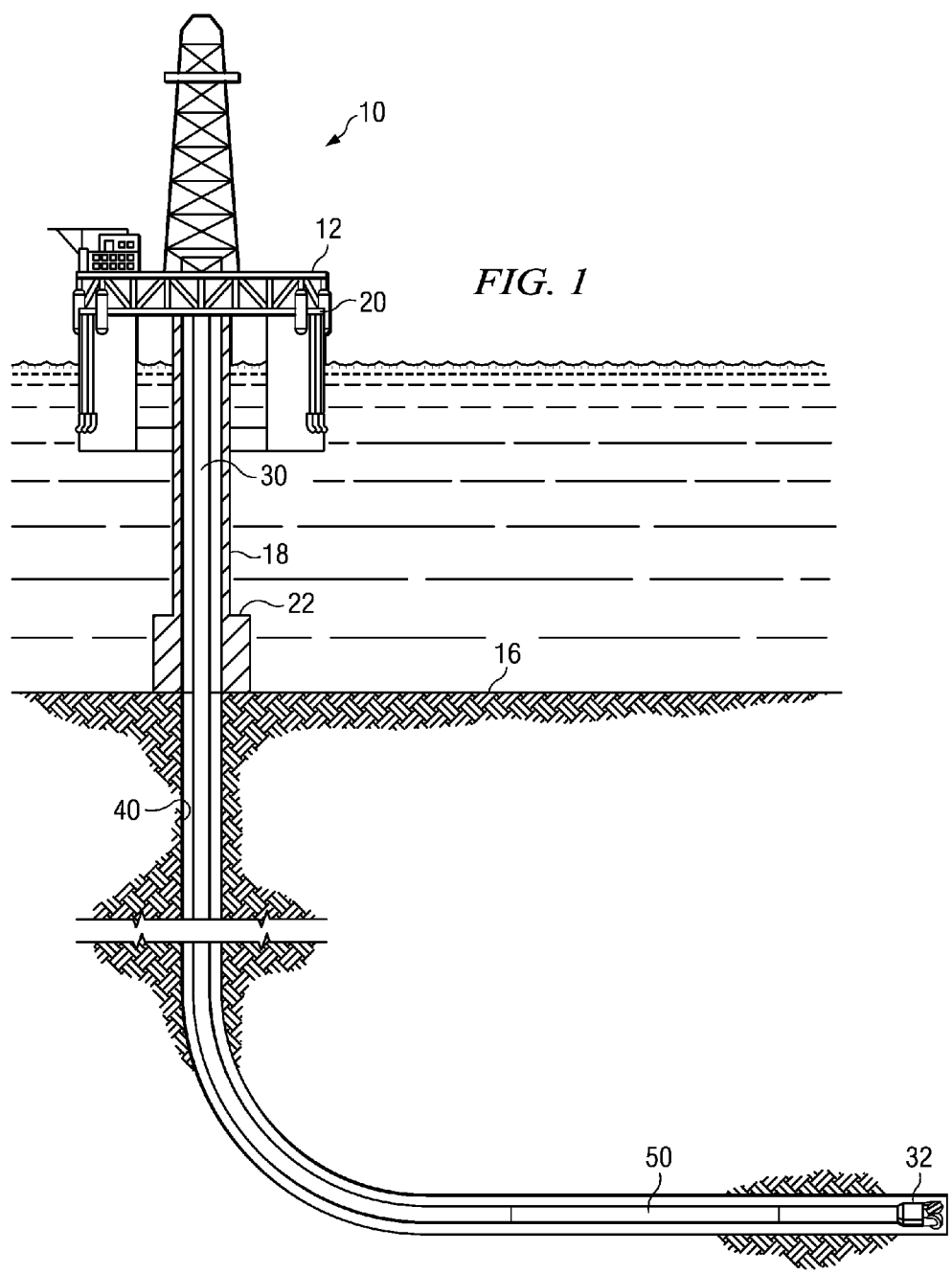
FIG. 1 depicts one example of a rig on which electromagnetic logging tools may be utilized.

FIG. 1 depicts an example drilling rig 10 suitable for employing various method embodiments disclosed herein. A semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering a drill string 30, which, as shown, extends into borehole 40 and includes a drill bit 32 deployed at the lower end of a bottom hole assembly (BHA) that further includes an electromagnetic measurement tool 50 (such as PeriScope®) suitable for making downhole electromagnetic logging measurements.

It will be understood that the deployment illustrated on FIG. 1 is merely an example. Drill string 30 may include substantially any suitable downhole tool components, for example, including a steering tool such as a rotary steerable tool, a downhole telemetry system, and one or more MWD or LWD tools including various sensors for sensing downhole characteristics of the borehole and the surrounding formation. The disclosed embodiments are by no means limited to any particular drill string configuration.

It will be further understood that disclosed embodiments are not limited to use with a semisubmersible platform 12 as illustrated on FIG. 1. The disclosed embodiments are equally well suited for use with either onshore or offshore subterranean operations. Moreover, it will be appreciated that the terms borehole and wellbore are used interchangeably herein.

Figure 2:
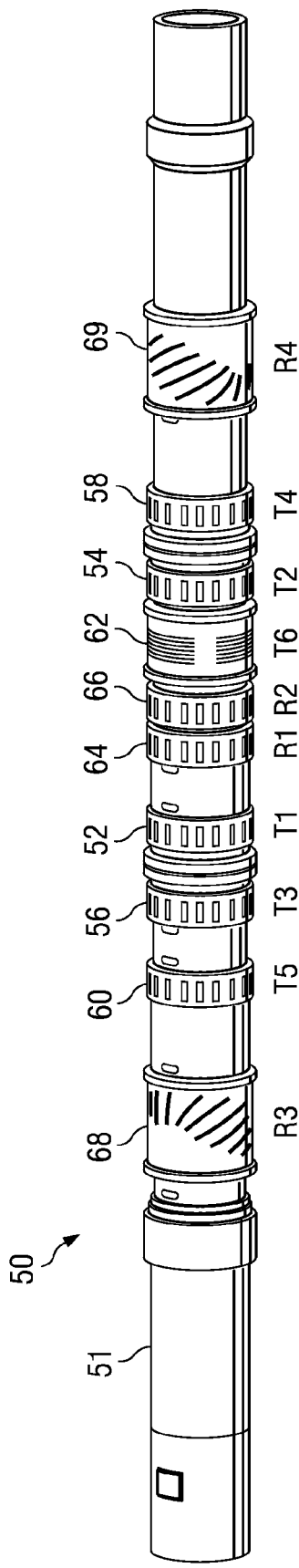
FIG. 2 depicts one example of the electromagnetic logging tool of FIG. 1.

FIG. 2 depicts one example of electromagnetic measurement tool 50. In the depicted embodiment measurement tool 50 includes a directional deep-reading logging-while-drilling drilling tool including multiple transmitters T1, T2, T3, T4, T5, and T6 depicted at 52, 54, 56, 58, 60, and 62 and multiple receivers R1, R2, R3, and R4 depicted at 64, 66, 68, and 69 spaced axially along tool body 51. In the depicted example, measurement tool 50 includes axial, transverse, and tilted antennas. An axial antenna is one whose dipole moment is substantially parallel with the longitudinal axis of the tool, for example, as shown at 54. Axial antennas are commonly wound about the circumference of the logging tool such that the plane of the antenna is orthogonal to the tool axis. Axial antennas produce a radiation pattern that is equivalent to a dipole along the axis of the tool (by convention the z direction). A transverse antenna is one whose dipole moment is substantially perpendicular to the longitudinal axis of the tool, for example, as shown at 62. A transverse antenna may include a saddle coil (e.g., as disclosed in U.S. Patent Publications 2011/0074427 and 2011/0238312) and generate a radiation pattern that is equivalent to a dipole that is perpendicular to the axis of the tool (by convention the x or y direction). A tilted antenna is one whose dipole moment is neither parallel nor perpendicular to the longitudinal axis of the tool, for example, as shown at 68. Tilted antennas are well known in the art and commonly generate a mixed mode radiation pattern (i.e., a radiation pattern in which the dipole moment is neither parallel nor perpendicular with the tool axis).

In the particular embodiment depicted on FIG. 2, five of the transmitter antennas (T1, T2, T3, T4, and T5) are axial antennas spaced along the axis of the tool. A sixth transmitter antenna (T6) is a transverse antenna. First and second receivers (R1 and R2) located axially between the transmitters are axial antennas and may be used to obtain conventional type propagation resistivity measurements. Third and fourth receivers (R3 and R4) are tilted antennas located axially about the transmitters. Such a directional arrangement (including tilted and/or transverse antennas) produces a preferential sensitivity on one azimuthal side of the tool 50 that enables bed boundaries and other features of the subterranean formations to be identified and located.

It will be understood that the method embodiments disclosed herein are not limited to any particular electromagnetic logging tool configuration. The depiction on FIG. 2 is merely one example of a suitable electromagnetic logging tool. Other configurations may also be utilized. For example, U.S. Patent Publication 2011/0133740 (which is fully incorporated by reference herein), discloses a modular electromagnetic tool configuration that may be used to obtain deep reading directional resistivity data. Such modular designs allow the transmitter and receiver antennas to be placed at various locations within a BHA, or at locations in the drill string above the BHA. The number and configuration of the transmitters and receivers deployed in the BHA as well as the axial spacing between the various modules may be selected based on subterranean formation properties.

Figure 3A:
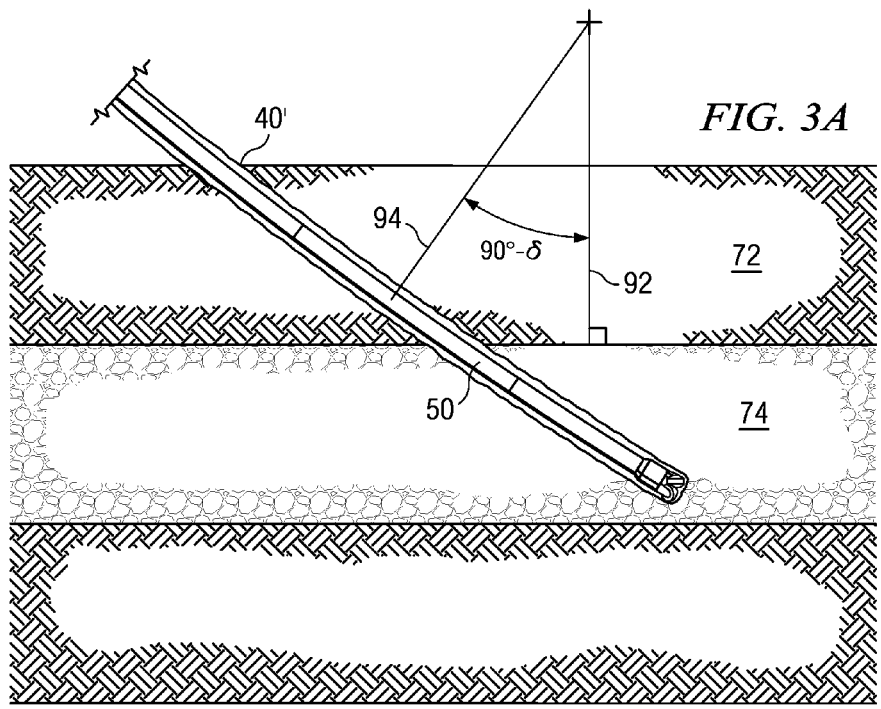
FIG. 3A schematically depicts an electromagnetic logging tool deployed in a subterranean borehole.

FIG. 3A is a schematic drawing that depicts a BHA including electromagnetic measurement tool 50 deployed in a subterranean borehole 40'. In the depicted embodiment, the borehole 40' intersects a number of strata (e.g., strata 72 and 74) at an apparent dip angle (the complement of the apparent dip angle 90-$\delta$ is shown on FIG. 3A). The apparent dip angle may be understood to be the angle between two directions; (i) the direction normal to the boundary (or the bed) as indicated at 92 and the top of the hole (TOH) direction (the direction opposite that of the gravity vector being projected on the cross sectional plane of the electromagnetic measurement tool) as indicated at 94 and thus defines the angular relationship between the tool axis (or borehole axis) and the plane of the bed boundary (e.g., the interface between strata 72 and 74).

Figure 3B:
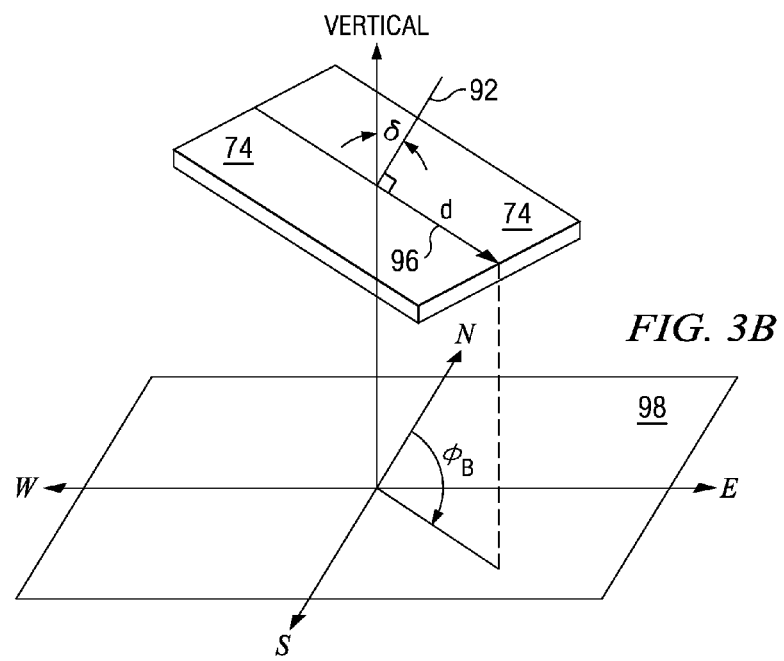
FIG. 3B schematically depicts an elevated bedding plane for defining the dip azimuth angle.

The dip azimuth angle (which may also be referred to as the apparent dip azimuth angle) is the formation bearing and defines the azimuth angle of the apparent dip (i.e. the direction of the tilt or dip with respect to a reference direction such as magnetic north). The dip azimuth angle may also be understood to be the angle through which the drilling tool must be rotated such that the x-axis (a predefined direction transverse to the tool axis) points in the direction of the dip vector (the direction of maximum inclination). A dip azimuth angle $\phi_B$ is depicted on FIG. 3B as the angle between north and the projection of the dip vector 96 on the horizontal plane 98. The dip angle $\delta$ is also indicated on FIG. 3B.

Application of a time varying electric current (an alternating current) in one of the transmitting antennas (e.g., T1, T2, T3, T4, T5, or T6) produces a corresponding time varying magnetic field in the formation. The magnetic field in turn induces electrical currents (eddy currents) in the conductive formation. These eddy currents further produce secondary magnetic fields which may produce a voltage response in one or more receiving antennae (e.g., in receiving antennas R1, R2, R3, and R4). The measured voltage in one or more of the receiving antennas may be processed, as is known to those of ordinary skill in the art, to obtain one or more measurements of the secondary magnetic field, which may in turn be further processed to estimate various formation properties (e.g., resistivity (conductivity), resistivity anisotropy, distance to a remote bed, the apparent dip angle, and/or the dip azimuth angle.

Various prior art methods are available for computing the dip azimuth angle. For example, the dip azimuth angle may be estimated as follows. The measurement voltage in a tilted receiver varies as a function of the sensor azimuth (i.e., the tool face angle), for example, as described in Equation 1.

$$V(f, t, r) = a_0 + a_1 \cos \phi + b_1 \sin \phi + a_2 \cos 2\phi + b_2 \sin 2\phi \quad \text{Equation 1}$$

where $V(f, t, r)$ represents a voltage in the tilted receiver for a particular frequency, transmitter, receiver (f, t, r) combination, $\phi$ represents the tool face angle, and $a_0$, $a_1$, $a_2$, $b_1$, and $b_2$ represent complex fitting coefficients (by complex it is meant that each of the fitting coefficients includes a real and an imaginary component). While not explicitly indicated in Equation 1, it will be understood that the complex fitting coefficients $a_0$, $a_1$, $a_2$, $b_1$, and $b_2$ are also functions of the frequency, transmitter, and receiver combination (f, t, r). By fitting the azimuth (tool face angle) dependent signal to a Fourier series downhole, the complex fitting coefficients of the voltages for each transmitter receiver pair (measurement array) may be solved while the tool rotates. These complex fitting coefficients may then be used to calculate the phase-shift and attenuation values as well as the dip azimuth angle (also referred to in the art as the bedding orientation angle).

The dip azimuth angle may be estimated from the real and imaginary components of the voltage V given in Equation 1. This may be represented mathematically, for example, as follows:

$$\text{real}(V(f, t, r)) = \sqrt{\text{real}\left(\frac{a_1}{a_0}\right)^2 + \text{real}\left(\frac{b_1}{b_0}\right)^2} \cos(\phi - \phi_B^{RE}(f, t, r)) \quad \text{Equation 2}$$

$$\text{imag}(V(f, t, r)) = \sqrt{\text{imag}\left(\frac{a_1}{a_0}\right)^2 + \text{imag}\left(\frac{b_1}{b_0}\right)^2}$$

$$\cos(\phi - \phi_B^{IM}(f, t, r))$$

$$\phi_B^{RE}(f, t, r) = \arctan\left[\frac{\text{real}(b_1)}{\text{real}(a_1)}\right]$$

$$\phi_B^{IM}(f, t, r) = \arctan\left[\frac{\text{imag}(b_1)}{\text{imag}(a_1)}\right]$$

where real(·) and imag(·) represent the real and imaginary components of the indicated arguments and $\phi_B$ represents the dip azimuth angle (with $\phi_B^{RE}$ representing a real component of the dip azimuth angle and $\phi_B^{IM}$ representing an imaginary component of the dip azimuth angle).

Since the real and imaginary components of the dip azimuth angle are not necessarily equal (and are often not equal), a weighted average of these angle estimates may be used to obtain the dip azimuth angle using the prior art methods. The dip azimuth angle may be computed using weighted averaging of individual angles for each of the utilized transmitter receiver pairs at each measurement frequency which may be represented mathematically, for example, as follows:

$$\phi_i(f, t, r) = \frac{\sqrt{a_{RE1}^2 + b_{RE1}^2}}{\sqrt{a_{RE1}^2 + b_{RE1}^2} + \sqrt{a_{IM1}^2 + b_{IM1}^2}} \arctan\left(\frac{b_{RE1}}{a_{RE1}}\right) + $$
$$\frac{\sqrt{a_{IM1}^2 + b_{IM1}^2}}{\sqrt{a_{RE1}^2 + b_{RE1}^2} + \sqrt{a_{IM1}^2 - b_{IM1}^2}} \arctan\left(\frac{b_{IM1}}{a_{IM1}}\right)$$

Equation 3 where $\phi_i$ (f, t, r) represents the dip azimuth angle computed for each transmitter receiver pair at each frequency of interest and RE and IM indicate the real and imaginary components of the various complex coefficients given in Equation 1. The angle of the tool with respect to the layering may be computed by averaging individual angles for each transmitter receiver pair with the same spacing of the symmetrized directional measurement pair.

It will be appreciated that special care is often required to avoid phase wrap effects while averaging (due to the multiple arctangent calculations). Special care may also be required in solving the inverse tangent functions. Because the arctangent function is non-linear, this method of averaging may introduce a statistical bias. As described in more detail below with respect to FIGS. 5A through 5E, the dip azimuth angles computed using the prior art method also tends to be noisy. Hence, there is a need for an improved method for obtaining the dip azimuth angle.

Figure 4:
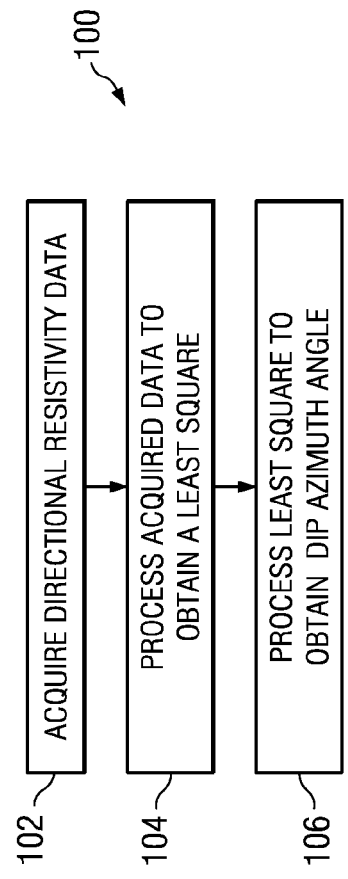
FIG. 4 depicts a flow chart of one disclosed method embodiment.

FIG. 4 depicts a flow chart of one disclosed method embodiment 100. A drill string including an electromagnetic measurement tool (e.g., as depicted in FIGS. 1, 2, and 3) is deployed in a subterranean wellbore. Directional resistivity data are acquired at 102 in a region of interest (e.g., in a preselected region of the wellbore in which an estimation of the dip azimuth angle is desired). The acquired data may include sensor data from at least one measurement array (i.e., a transmitter having at least one transmitting antenna spaced apart from a receiver having at least one receiving antenna). The measurement array may include substantially any suitable transmitter and receiver antennas that generate a cross coupling component.

The acquired data may include at least one of the cross coupling components (e.g., $V_{xz}$ and $V_{zx}$) in the voltage tensor. For example, when using directional transmitter and receiver arrangements, the acquired data may include selected cross coupling components from the following voltage tensor:

$$V = \begin{pmatrix} V_{xx} & V_{xy} & V_{xz} \\ V_{yx} & V_{yy} & V_{yz} \\ V_{zx} & V_{zy} & V_{zz} \end{pmatrix}$$

wherein the first index (x, y, or z) refers to the transmitter dipole and the second index refers to the receiver dipole. By convention, the x and y indices refer to transverse moments while the z index refers to an axial moment. The disclosed embodiments are of course not limited to any particular conventions. Nor are they limited to using purely axial or purely transverse transmitter and/or receiver antennas. In fact, selected embodiments described in more detail below make use of one or more tilted transmitter or receiver antennas. In such embodiments, the measured voltage in the receiving antenna includes both direct and cross coupling components.

The acquired data may also include various measurements that are derived from the antenna couplings. These measurements may include, for example, symmetrized directional amplitude and phase (USDA and USDP), anti-symmetrized directional amplitude and phase (UADA and UADP), harmonic resistivity amplitude and phase (UHRA and UHRP) and harmonic anisotropy amplitude and phase (UHAA and UHAP). These parameters are known to those of ordinary skill in the art and may be derived from the antenna couplings, for example, as follows:

$$USDA = 20\log_{10}\left(\frac{V_{zz} - V_{zx}}{V_{zz} + V_{zx}} \cdot \frac{V_{zz} + V_{xz}}{V_{zz} - V_{xz}}\right)$$

$$USDP = -\text{angle}\left(\frac{V_{zz} - V_{zx}}{V_{zz} + V_{zx}} \cdot \frac{V_{zz} + V_{xz}}{V_{zz} - V_{xz}}\right)$$

$$UADA = 20\log_{10}\left(\frac{V_{zz} - V_{zx}}{V_{zz} + V_{zx}} \cdot \frac{V_{zz} - V_{xz}}{V_{zz} + V_{xz}}\right)$$

$$UADP = -\text{angle}\left(\frac{V_{zz} - V_{zx}}{V_{zz} + V_{zx}} \cdot \frac{V_{zz} - V_{xz}}{V_{zz} + V_{xz}}\right)$$

$$UHRA = 20\log_{10}\left(\frac{-2V_{zz}}{V_{xx} + V_{yy}}\right)$$

$$UHRP = -\text{angle}\left(\frac{-2V_{zz}}{V_{xx} + V_{yy}}\right)$$

$$UHAA = 20\log\left(\frac{V_{xx}}{V_{yy}}\right)$$

$$UHAP = -\text{angle}\left(\frac{V_{xx}}{V_{yy}}\right)$$

The above list is by no means exhaustive. Other derived parameters may of course be acquired at 102.

With continued reference to FIG. 4, the voltage measurements may be processed (e.g., via a downhole processor) to obtain a least square at 104 which is in turn further processed in combination with various complex fitting coefficients at 106 to obtain the dip azimuth angle. Such processing may proceed, for example, according to the following mathematical equations. The received voltage varies periodically with the tool face angle as the electromagnetic measurement tool rotes in the borehole, for example, as follows:

$$V_n = b_n \cos\phi + c_n \sin\phi \qquad \text{Equation 4}$$

where $V_n$ represents the voltage in a tilted receiver at a particular transmitter receiver pair and frequency n (i.e., a particular measurement), $\phi$ represents the tool face angle, and $b_n$ and $c_n$ are defined as follows using the complex fitting coefficients from Equation 1:

$$b_n = \frac{a_1(f, t, r)}{a_0(f, t, r)}$$

-continued $$c_n = \frac{b_1(f, t, r)}{a_0(f, t, r)}$$

It will be understood that Equation 4 represents a first order periodic equation describing the periodic oscillation of the receiver voltage with tool rotation. An equation including higher order terms (e.g., including second order terms as given above in Equation 1) may also be utilized. The disclosed embodiments are not limited in this regard.

The processing at 104 may include computing a weighted sum of squares of residuals L for one or more voltage measurements n, for example, as follows:

$$L = \sum_n w_n |V_n|^2 = \sum_n w_n |b_n \cos\phi + c_n \sin\phi|^2 \qquad \text{Equation 5}$$

where $w_n$ represent the statistical weights assigned to each voltage measurement (i.e., to each n for the particular frequency, transmitter, receiver combination). The angular dependence of L may be simplified by expanding as follows:

$$L = \sum_n w_n [|b_n|^2 \cos^2\phi + (b_n^* c_n + b_n c_n^*)\cos\phi\sin\phi + |c_n|^2 \sin^2\phi] \qquad \text{Equation 6}$$

which may be further reduced to:

$$L = P + Q \cos 2\phi + R \sin 2\phi \qquad \text{Equation 7}$$

where $$P = \frac{1}{2}\sum_n w_n [|b_n|^2 + |c_n|^2]$$

$$Q = \frac{1}{2}\sum_n w_n [|b_n|^2 - |c_n|^2]$$

$$R = \sum_n w_n \mathrm{real}(b_n^* c_n)$$

The real numbers Q and R may be expressed, for example, as follows:

$$Q = S \cos 2\alpha$$

$$R = S \sin 2\alpha$$

where $$S = \sqrt{Q^2 + R^2}$$

$$\alpha = \frac{1}{2}\arctan2(Q, R) \in \left[-\frac{\pi}{2}, \frac{\pi}{2}\right]$$

Thus, L may be expressed in terms of P, S and α as follows:

$$L = P + S \cos 2(\phi - \alpha) \qquad \text{Equation 8}$$

It will be readily appreciated that the value of L reaches a maximum value P+S when $\phi = \alpha \bmod \pi$ and that the value of L reaches a minimum value P−S when $\phi = (\alpha + \pi/2) \bmod \pi$. A comparison of Equation 8 with Equation 2 above further indicates that α in Equation 8 represents the least square estimate of the dip azimuth angle $\phi_B$. Hence, the processing in 104 further includes computing the coefficients P, Q, R, and S and computing the dip azimuth angle α, for example, using Equation 8.

As described in more detail below, such least square estimation (computing the dip azimuth angle by minimizing the weighted sum of squared residuals of the acquired voltages) provides a more accurate, less noisy estimation of the dip azimuth angle. Moreover, the arctangent function is computed only once at the end of the process thereby avoiding phase wrapping.

Log quality control may be implemented, for example, via computing a confidence interval (e.g., error bars) for the obtained dip azimuth angle. In Equation 7 Q and R may be treated as a weighted average of $|b_n|^2 - |c_n|^2$ and real $(b_n^* c_n)$ allowing the standard deviations in Q and R to be computed. Such standard deviations may be thought of as representing a confidence interval in Q and R (noted as ΔQ and ΔR) and may be used to compute a confidence interval 2Δα for the dip azimuth angle, for example, as follows:

$$2\Delta\alpha = \frac{1}{R^2 + Q^2}(Q \cdot \Delta R - R \cdot \Delta Q) \qquad \text{Equation 9}$$

Upper and lower bounds of the dip azimuth angle confidence interval may then be computed, for example, as follows:

errhi=α+abs(Δα)

errlo=α−abs(Δα)  Equation 10

The errlo and errhi values represent the upper and lower bounds of the confidence interval. As will be understood by those of ordinary skill in the art, the smaller the range (the closer the errlo and errhi values are to one another) the better the certainty in the computed dip azimuth angle.

It will be understood that the least square estimation methodology described above may be applied to substantially any electromagnetic logging measurements to obtain the dip azimuth angle. For example, electromagnetic measurements may be made at substantially any suitable electromagnetic radiation frequency (e.g., 100, 400 and/or 2000 kHz). Moreover, the electromagnetic measurements may employ substantially any suitable transmitter receiver cross coupling components generated using substantially any suitable measurement array. For example, the dip azimuth angle may be computed using measurements made with an axial transmitter and a tilted and/or transverse receiver, a transverse transmitter and an axial and/or tilted receiver, and/or a tilted transmitter and an axial receiver. The transmitter and receiver in the measurement array may further have substantially any suitable axial spacing on the electromagnetic measurement tool body or bottom hole assembly. The disclosed embodiments are expressly not limited in these regards.

It will be understood that the disclosed methodology applies equally well to electrical dipole antennas, for example, an electrical dipole transmitter coupled with a button electrode receiver.

Figure 5B:
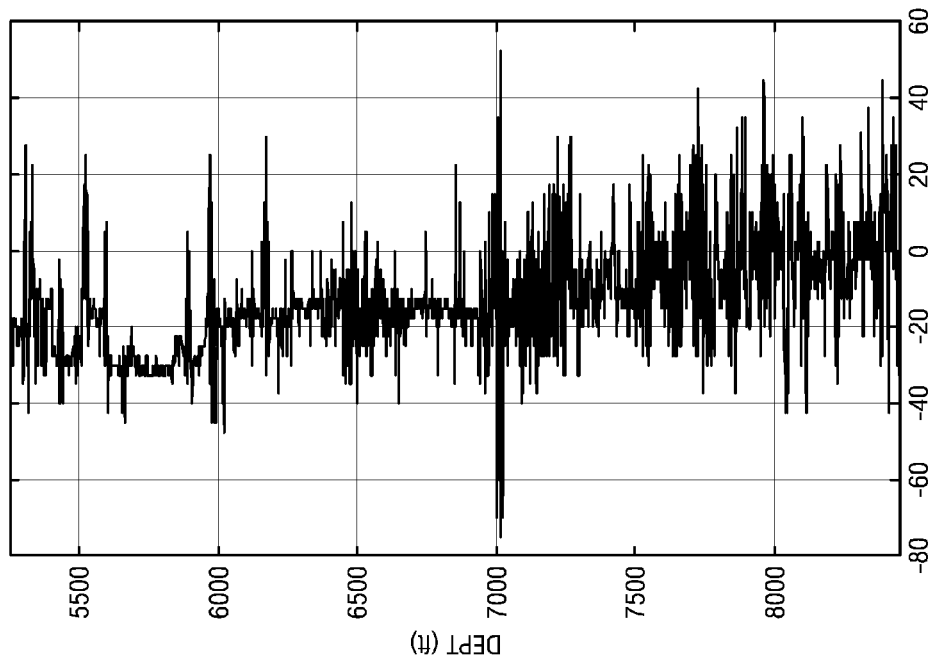
FIGS. 5A, 5B, 5C, 5D, and 5E depict electromagnetic logs for an experimental test in which the disclosed method embodiments were utilized to obtain dip azimuth angles while drilling.
Figure 5A:
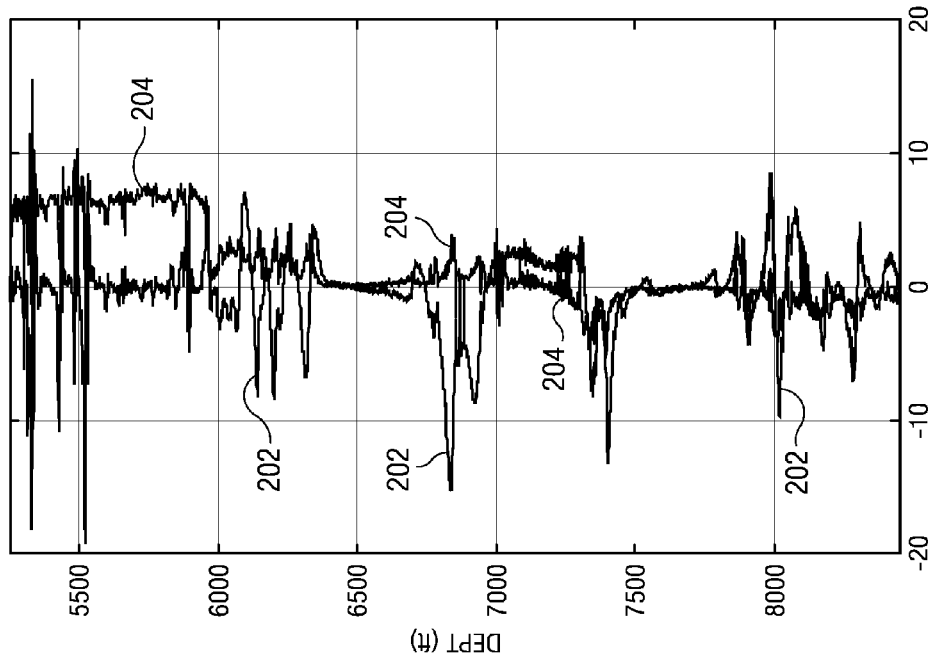
Figure 5E:
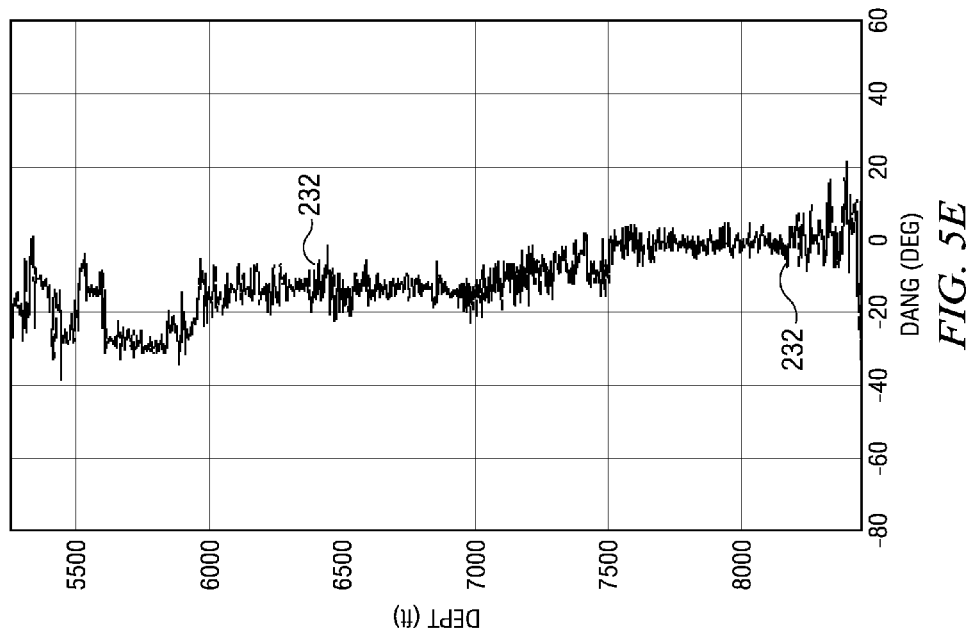

The disclosed embodiments are now described in further detail with respect to the following non-limiting example in FIGS. 5A, 5B, 5C, 5D, and 5E. FIG. 5A depicts an electromagnetic log plotting attenuation (ATT) versus borehole depth. The two curves in the track plot symmetrized 202 and anti-symmetrized 204 attenuation values as a function of depth.

FIG. 5B plots the dip azimuth angle (DANG) 212 versus borehole depth. The dip azimuth angle was obtained from the electromagnetic measurements using the prior art methodology described above with respect to Equations 1 through 3. Note that the computed dip azimuth value obtained using the prior art methodology is noisy, particularly at depths ranging from about 7000 to about 8500 feet. The dip angle varies from about −40 to about 40 degrees in this region of the borehole.

Figure 5C:
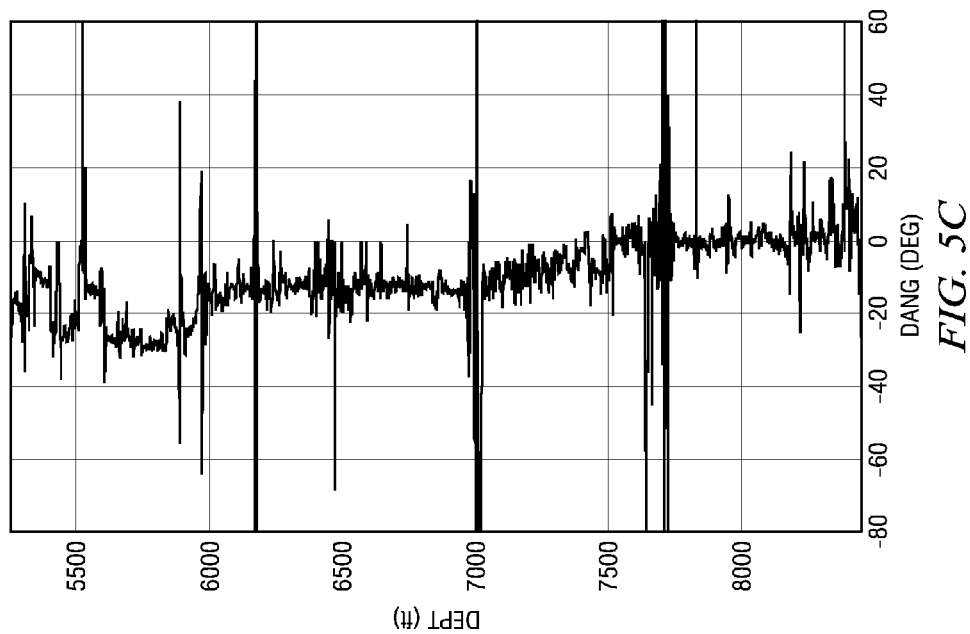

FIG. 5C also plots dip azimuth angle (DANG) 222 versus borehole depth. The dip azimuth angle plotted in FIG. 5C was obtained from the electromagnetic measurements using the disclosed methodology described above with respect to FIG. 4 and Equations 4 through 8. As is readily apparent by comparing FIGS. 5B and 5C, the dip azimuth angle obtained using the disclosed least square methodology is considerably more stable with the noise at certain depths being less than plus or minus 2 degrees.

Figure 5D:
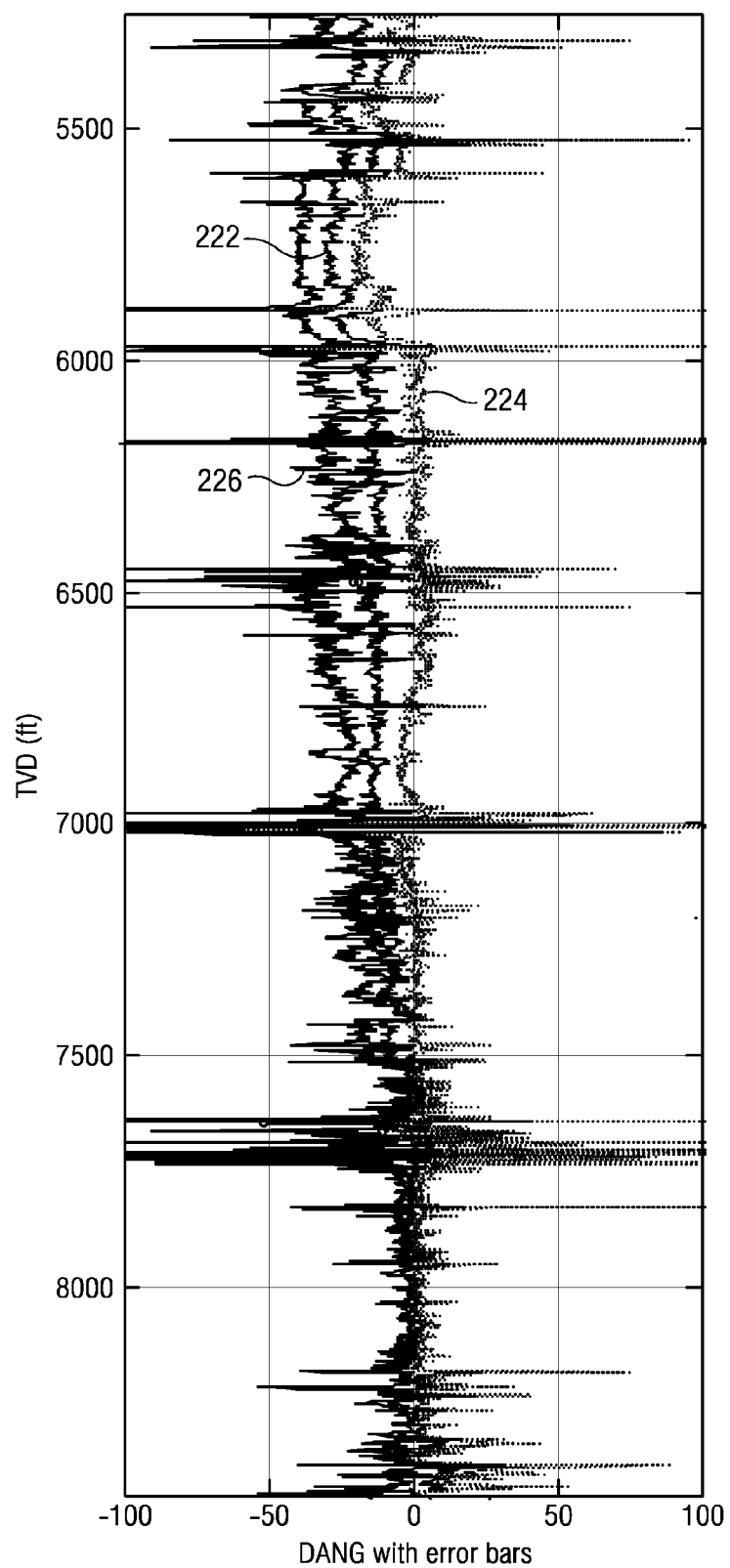

FIG. 5D plots the dip azimuth angle 222 versus borehole depth with upper 224 and lower 226 error bars. Deeper in the borehole (at depths greater than about 7500 feet) the three curves 222, 224, and 226 substantially overlap one another indicating a high degree of accuracy in the obtained dip azimuth angle (a tight confidence interval). At shallower depths (e.g., at depths less than about 7000 feet) range increases to about 30 degrees indicating a larger uncertainty in that region, although still considerably less than the noise in the prior art control depicted on FIG. 5B.

FIG. 5E again plots the dip azimuth angle 232 versus borehole depth. In FIG. 5C, the dip azimuth angle computed using the disclosed method embodiments include a few large spikes (e.g., at 234) having meaningless values (due to the high uncertainty at that particular depth). These spikes have been removed in the FIG. 5E. Note that the remaining log provides stable, accurate dip azimuth values with noise generally less than plus or minus 5 degrees.

It will be understood that the electromagnetic methods for obtaining a dip azimuth angle are generally implemented on an electronic processor (e.g., via a computer processor or microcontroller, ASIC, FPGA, SoC, etc.). Specifically, in describing the functions, methods, and/or steps that can be performed in accordance with the disclosed embodiments, any and/or all of these functions may be performed using an automated or computerized process. As will be appreciated by those of ordinary skill in the art, the systems, methods, and procedures described herein can be embodied in a programmable computer, computer executable software, or digital circuitry. The software can be stored on computer readable media, such as non-transitory computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc. The disclosed embodiments are in no way limited in regards to any particular computer hardware and/or software arrangement.

In certain embodiments it may be advantageous to implement the disclosed methodology for computing a dip azimuth angle on a downhole processor. By downhole processor it is meant an electronic processor (e.g., a microprocessor or digital controller) deployed in the drill string (e.g., in the electromagnetic logging tool or elsewhere in the BHA). In such embodiments, the computed dip azimuth angles may be stored in downhole memory and/or transmitted to the surface while drilling via known telemetry techniques (e.g., mud pulse telemetry or wired drill pipe). When transmitted to the surface, the dip azimuth angles may be further processed to obtain a subsequent drilling direction or a subsequent steering tool setting to guide drilling in a geo-steering application. In alternative embodiments the dip azimuth angles may be computed at the surface using a surface processor (a surface computer) and electromagnetic measurement data stored in the tool memory or via processing raw voltages and/or fitting coefficients transmitted to the surface during a drilling operation. The disclosed subject matter is not limited in this regard.

Although an electromagnetic method for obtaining dip azimuth angle and certain advantages thereof have been described in detail, it should be understood that various changes, substitutions and alternations can be made herein without departing from the spirit and scope of the disclosure as defined by the appended claims.

What is claimed is:

1. A method for computing a dip azimuth angle from downhole electromagnetic measurements, the method comprising:
    (a) placing an apparatus to conduct electromagnetic measurements in a subterranean borehole such that the apparatus is positioned next to a formation of interest;
    (b) applying one of a time varying electric current and a time varying alternating current to at least one antenna in the apparatus;
    (c) acquiring a plurality of voltage measurements at a corresponding plurality of measurement arrays deployed in the subterranean borehole, wherein the arrays are placed within the apparatus;
    (d) causing a processor to process the voltage measurements acquired in (a) to obtain least squares complex fitting coefficients defined by a preset voltage measurement equation at a receiving antenna for the apparatus;
    (e) causing the processor to process the least squares complex fitting coefficients to obtain the dip azimuth angle by minimizing a weighted average of squares of the plurality of voltage measurements;
    (f) transmitting the obtained dip azimuth angle to a surface location; and
    (g) plotting the dip azimuth angle versus a borehole depth at which the dip azimuth angle was calculated.

2. The method of claim 1, wherein at least one of the measurement arrays used to acquire the voltage measurements in (c) has a tilted receiver antenna.

3. The method of claim 1, wherein at least one of the measurement arrays used to acquire the voltage measurements in (c) has an axial or a transverse transmitter antenna.

4. The method of claim 1, wherein a least square weighted sum of squared residuals for at least one voltage measurement is computed according to the following equation:

$$L = \sum_n w_n |V_n|^2$$

wherein L represents the weighted sum of squared residuals, $V_n$ represent the plurality of voltage measurements n, and $w_n$ represent statistical weights assigned to each of the plurality of voltage measurements n.

5. The method of claim 4, wherein the processor processes the least square weighted sum of squared residuals and a plurality of the complex fitting coefficients of a voltage signal acquired in (d) to obtain the dip azimuth angle in (e).

6. The method of claim 5, wherein the dip azimuth angle is computed in (e) according to the following equation:

$$L = P + S \cos 2(\phi - \alpha)$$

wherein L represents the weighted sum of squared residuals, $\alpha$ represents the dip azimuth angle, $\phi$ represents a tool face angle, and P and S represent weighted averages of the complex fitting coefficients.

7. The method of claim 6, wherein the weighted averages of the complex fitting coefficients P and S are computed according to the following equations:

$$P = \frac{1}{2} \sum_n [|b_n|^2 + |c_n|^2]$$

$$S = \sqrt{Q^2 + R^2}$$

wherein:

$$Q = \frac{1}{2} \sum_n w_n [|b_n|^2 - |c_n|^2]$$

$$R = \sum_n w_n \text{real}(b_n^* c_n)$$

and wherein $w_n$ represent statistical weights assigned to each of a plurality of voltage measurements n acquired in (c), and $b_n$ and $c_n$ represent the complex fitting coefficients for each of the plurality of voltage measurements.

8. The method of claim 1, wherein the dip azimuth angle is computed according to the following equation:

$$\alpha = \frac{1}{2} \arctan2(R, Q) \in \left[-\frac{\pi}{2}, \frac{\pi}{2}\right]$$

wherein $\alpha$ represents the dip azimuth angle, and Q and R represent the least squares coefficients of the plurality of voltage measurements obtained in (c).

9. The method of claim 1, further comprising:
(h) causing the processor to compute a confidence interval for the dip azimuth angle obtained in (e).

10. The method of claim 9, wherein the confidence interval is computed according to the following equation:

$$2\Delta\alpha = \frac{1}{R^2 + Q^2}(Q \cdot \Delta R - R \cdot \Delta Q)$$

wherein $2\Delta\alpha$ represents the confidence interval, R and Q represent least squares coefficients of the plurality of voltage measurements obtained in (c), $\Delta R$ and $\Delta Q$ represent standard deviations of R and Q.

11. The method of claim 10, wherein upper and lower bounds of the confidence interval are computed according to the following equations:

$$\text{errhi} = \alpha + abs(\Delta\alpha)$$

$$\text{errlo} = \alpha - abs(\Delta\alpha)$$

wherein errhi and errlo represent the upper and lower bounds of the confidence interval and $\alpha$ represents the dip azimuth angle obtained in (e).

12. The method of claim 1, wherein said processing in (d) and (e) is performed using a downhole processor.

13. The method of claim 1, further comprising:
(h) further processing the dip azimuth angle at the surface location to obtain a subsequent drilling direction for the subterranean borehole.

* * * * *